United States Patent [19]

Bonomi et al.

[11] Patent Number: 4,885,836
[45] Date of Patent: Dec. 12, 1989

[54] RIVETING PROCESS AND APPARATUS

[75] Inventors: Giovanni B. Bonomi; Luigi Giacomini, both of Mt. Prospect; Christiano Bonomi; Carmine Aresa, both of Des Plaines; Valerio Frigo, Des Plaines, all of Ill.

[73] Assignee: IMTA, Rockford, Ill.

[21] Appl. No.: 183,697

[22] Filed: Apr. 19, 1988

[51] Int. Cl.⁴ ............... B21J 15/02; B21J 15/10
[52] U.S. Cl. ................... 29/524.1; 29/34 B; 29/243.54; 29/525.2; 29/818; 227/51; 227/58
[58] Field of Search ............... 29/243.53, 243.54, 509, 29/524.1, 525.2, 818, 34 B, 50; 227/51, 58

[56] References Cited

U.S. PATENT DOCUMENTS

| | | | |
|---|---|---|---|
| 3,491,930 | 1/1970 | Hill | 227/51 X |
| 3,543,985 | 12/1970 | Aldolphi | 227/51 X |
| 3,562,893 | 2/1971 | Winslow et al. | 227/51 X |
| 3,747,193 | 7/1973 | Gregory | 227/51 X |
| 4,180,195 | 12/1979 | Caley et al. | 227/51 |
| 4,203,204 | 5/1980 | Murphy | 29/524.1 X |
| 4,645,112 | 2/1987 | Davern et al. | 227/51 X |
| 4,662,556 | 5/1987 | Gidland | 29/525.2 X |
| 4,676,422 | 6/1987 | Gidlund et al. | 227/51 |
| 4,762,261 | 8/1988 | Hawly et al. | 29/243.53 X |

Primary Examiner—Mark Rosenbaum
Assistant Examiner—Andrew E. Rawlins
Attorney, Agent, or Firm—McCaleb, Lucas & Brugman

[57] ABSTRACT

Improved process and apparatus for assembling component parts by means of rivets or similar fasteners in which computer controlled robotic machining centers present selected tools in predetermined special position on opposing sides of the components which are held stationary in a fixture. The robots prepare the rivet holes at multiple selected locations, followed by repositioning of roboticly controlled tools at each hole location for the installation of the fasteners. Throughout hole preparation and fastener installation novel end effectors maintain a symmetrical balance of forces on the components in a manner which avoids stressing and deformation of the components, holding fixture and end assembly.

17 Claims, 9 Drawing Sheets

RIVETING PROCESS AND APPARATUS

This invention relates generally to the fastening art and more particularly to an improved process and apparatus for automating the assembly of structural components by means of rivets or similar fasteners.

BACKGROUND

While the hereinafter disclosed invention has special application to the aeronautics industry in which large skin panels, frequently of compound curvature, as well as supporting structural assemblies and components are integrated by riveting, the teachings herein are equally applicable to other industrial environments.

The normal procedure for installing a rivet basically involves the distinct operations of hole preparation, rivet insertion and rivet upsetting. In general all three such operational events are carried out and completed in series sequence at each rivet location.

In earlier times a blacksmith carried out these steps by hand, utilizing a hammer, piercing tools and an anvil, rivet by rivet.

By later practice the components to be assembled were held in fixed position and manually operated power tools, such as electrical or air powered drills and riveting guns, were employed to effect the necessary riveting procedures, again rivet by rivet.

More recently, heavy, stationary, semi-automatic riveting machines have been developed to perform these operations with the work pieces being moved relative to the machine; the latter generally having a C-frame supporting the working tools and the work pieces being moved into the open throat of the C frame. Again the riveting procedure is accomplished rivet by rivet.

Under the latest technology, remotely controlled high-speed mobile machine centers or "robots", capable of presenting one or more drive spindles in selected spacial positions and adapted to drive a variety of machine tool attachments have gained industrial popularity. To date, however, the use of such robots for riveting procedures has been largely experimental and limited to situations where a single robot having multiple drive spindles is used to interconnect support components or frame members of a fixture held wing assembly for instance, using blind rivet fasteners. In operation the robot completes the entire riveting procedure, i.e., hole preparation, rivet insertion and fastening in series, at each rivet location, before proceeding to the next riveting point.

The above briefly described state of the art leaves much to be desired. In those instances where the work pieces are moved relative to a stationary riveting machine, maneuvering and positioning of heavy or bulky assembly components is slow and difficult with the size and/or shape of the parts being limited by the dimensions, particularly the throat capacity, of the riveting machine. In the reverse condition, where the work pieces are held stationary in a fixture and the work tools moved relative thereto, as in the case of the described roboticly controlled tools, serious problems are encountered in accurately positioning and repositioning the tools accompanied by a propensity for deforming and overstressing the assembled parts, resulting in inconsistent and dimensionally inaccurate end assemblies.

BRIEF SUMMARY OF THE INVENTION

In recognition of the above and other shortcomings of previous technologies for assemblying components into a unified structure by the use of rivets and like fasteners, this invention provides an innovative and improved procedure or method and apparatus for producing consistently accurate, riveted assemblies.

In brief, this invention preferably is carried out in an assembly cell environment utilizing a pair of synchronized computer controlled robotic machining centers capable of automatically working and operating in mirror relationship on opposite sides of fixture held components to be assembled; the computers working the robots in accordance with memory banked design data for the complete assembly.

Preliminary to the assembly operation an inspection cycle is performed by robot mounted probes whereby a robot is capable of checking all of the fixture and individual components to be assembled to determine if such items are correctly positioned and dimensioned. To that end the fixture has designated reference points which permit precise positioning of the individual components. Once the inspection cycle has been performed and positioning of parts verified, the assembly cycle is begun which comprises a drilling or hole forming and preparation cycle followed by a rivet installation cycle.

Unlike the prevalent practice of the heretofore known technology, the hole preparation and riveting cycles, in accordance with this invention, are conducted in parallel as opposed to the currently employed series operation. That is to say, instead of successively preparing a hole, and inserting and upsetting a rivet at each hole location in accordance with the currently practiced "series" procedure, the present invention separates the hole preparation and the riveting cycles so that all the holes are initially prepared followed by subsequent installation of the rivets one by one in the previously prepared holes.

The hole preparation cycle preferably utilizes the rotatable spindle of the machining center or roboticly controlled tool head for rotatably driving drills, reamers, deburring tools and the like which are automatically selected and attached to the robot head from a machine tool center in accordance with a preselected and predetermined computer program. The hole drilling and preparation cycle is carried out by two robots working in mirror relationship on opposite sides of the assembly parts, utilizing end effectors and tools which are capable of clamping the assembly parts together, particularly adjacent the area in which the hole is to be formed without, however, creating undesired thrusts on the supporting fixtures or overloading or stressing of the assembly components. This clamping function importantly eliminates the formation or deposit of chips between the parts and prevents structural deformations.

Upon completion of the drilling cycle, the robots automatically deposit and reload specific tools and end effectors required in accordance with the particulars and characteristics of the rivet or fastener to be used. Due to the unique characteristics of the fixed support of the components in the fixture, the robots are importantly capable of finding the positions of the previously drilled holes with great accuracy in order to install the rivets therein. Again during the riveting procedure, the parts are clamped together under pressure from opposing end effectors in a manner which avoids the application of excessive force to the component parts and fixture.

A principle object of this invention is to provide a new and improved mechanized process and apparatus for interconnecting components of an assembly by means of rivets or similar fastening means.

A further object of this invention is to provide an improved fastening process for interjoining component parts in which mobile, roboticly controlled machine tools, work in mirror relationship on opposite faces of the components, moving between designated locations thereon to effect the preparation and formation of all of the fastener holes followed by the relocation of the machine tools at the precise positions of the previously formed holes for insertion and installation of the fasteners.

Still another important object of this invention is to provide an improved process and technique for fastening component parts together by means of rivets and like fasteners which is characterized by improved production efficiency and accuracy.

An additional important object of this invention is to provide an improved riveting process in which component parts are held in fixed position and hole forming and rivet applying tools are moved over opposite faces of the parts to first form all the rivet holes in the parts and thereafter to apply and install rivets in the previously formed holes.

Another important object of this invention is to provide an improved riveting process in which component parts held in a fixture are clamped together during hole drilling and rivet insertion cycles in a manner to avoid over stressing of the components and distortion of the finished assembly.

Another object of this invention is to provide an improved riveting procedure and apparatus using computer controlled roboticly driven machine tools moveable relative to and over opposed surfaces of fixedly held components to be assembled, by which all of the rivet receptive openings are formed through the component parts in precise locations followed by relocation of riveting tools at the previously formed hole locations for application and installation of rivet fasteners therein.

Still another object of this invention is to provide an automatic machine performed riveting process and technology which is capable of human intervention and performance at any stage.

A further important object of this invention is to provide computer controlled apparatus employing robots using end effectors which have all of the programmable parameters required for accomplishing hole preparation, rivet insertion and installation.

Having described this invention, the above and further objects, features and advantages thereof will become apparent to those skilled in the art from the following description of a preferred embodiment thereof, illustrated in the accompanying drawings and representing the best mode presently contemplating for enabling those of skill in the art to practice the this invention.

DESCRIPTION OF THE PREFERRED EMBODIMENT

Before entering into a detailed description of the process and apparatus technology according to this invention initial consideration will be given to the general characteristics of a preferred working environment in which to best carry out the various steps of the hereinafter to be described invention.

As heretofore noted the illustrated embodiment of this invention is related to the production and assembly of components and parts utilized in the aircraft industry in which large, relative heavy structures of complex shape, such as wings and fuselage sections are involved.

WORK CELL

Figure 1:
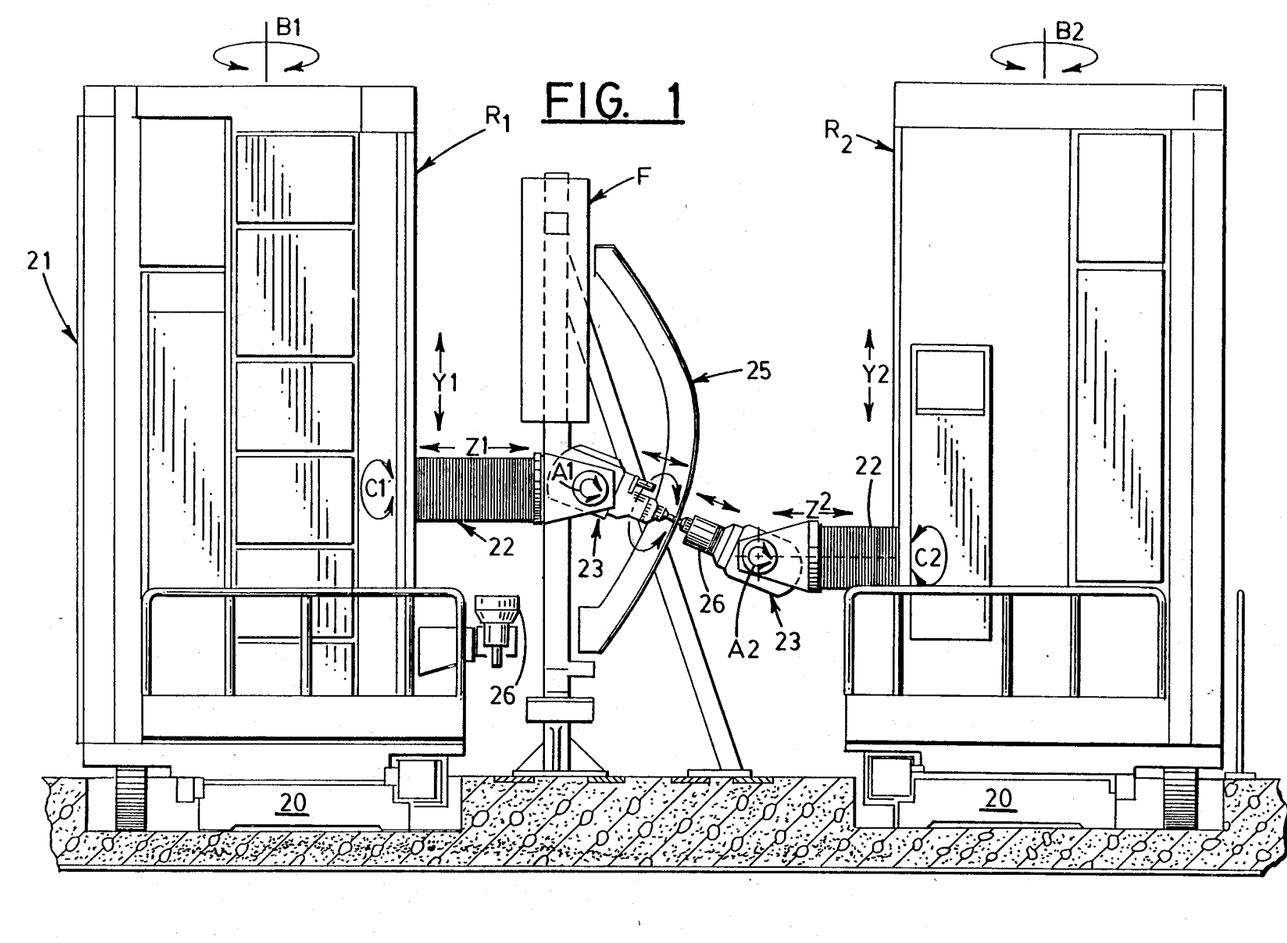
FIG. 1 is a schematic representation of a work cell and robot machine centers used in this invention.

In general the work cell environment in which the teachings of this invention preferably may be carried out is partially illustrated in FIG. 1 of the drawings. As shown the cell comprises at least two high speed machining centers or "robots" designated R1 and R2 mounted in parallel aisles to run along elongated horizontal tracks or bedways 20,20 in response to actuation of power driven rack and pinion drives. Each robot is of Cartesian structure having linear longitudinal, vertical and transverse X, Y and Z axes, the X axis being defined by the associated horizontal, linear bedways 20; the Y axis being defined by a central, vertical column 21 of the machine and the Z axis by a transversely related horizontal linear power ram 22. An articulated wrist or twist head 23 is disposed at the outer end of the ram 22 and comprises a pair of transverse rotary axes A and C. The column 21 is likewise rotatable about its vertical axis defining a third rotary axis B. Head 23 is equipped with an additional linear quill axis W capable of linear extension and retraction of tools affixed thereto independently of ram movement. The ram 22 is moveable along the Y and Z axes.

Located intermediate the two robots R1 and R2 is an automatic flexible or adjustable fixture (F) for holding the assembly parts and components, such as wing panels and ribs indicated generally at 25 in FIG. 1. It will be noted that the two robots work in mirror relationship on opposite sides of the fixture held work components. Fixture (F) is placed parallel to and between the X axes of the two robots.

The machine head 23 has a rotatable spindle designed for automatic tool changing via taper connections and carries various power supplies and specific performance features required for machine operations to be performed in the cell, such as drilling, contouring, riveting, etc.

Each robot is equipped with a horizontal platform which holds a rivet feed station and an automatic magazine for storing various end effectors 26 attachable to its machine tool head 23. A stationary rivet magazine and tool magazine are respectively located at ground level at the two extremes of the longitudinal stroke or aisles (X axis) for each robot. The rivet magazine refills the robot's rivet feed station while the tool magazine provides automatic tool management. Access to the tool magazine by each robot is effected by rotating its column about its vertical rotational axis (B axis) and moving the robot to the end of its X axis to a tool magazine where it may pick up and automatically change tools.

Alternatively, mobile magazines of the order taught in U.S. Pat. No. 4,344,221 of Aug. 17, 1982, for instance, may be employed to resupply tools, end effectors and fasteners to each robot in accordance with the computer controlled requirements for the assembly.

Figure 2:
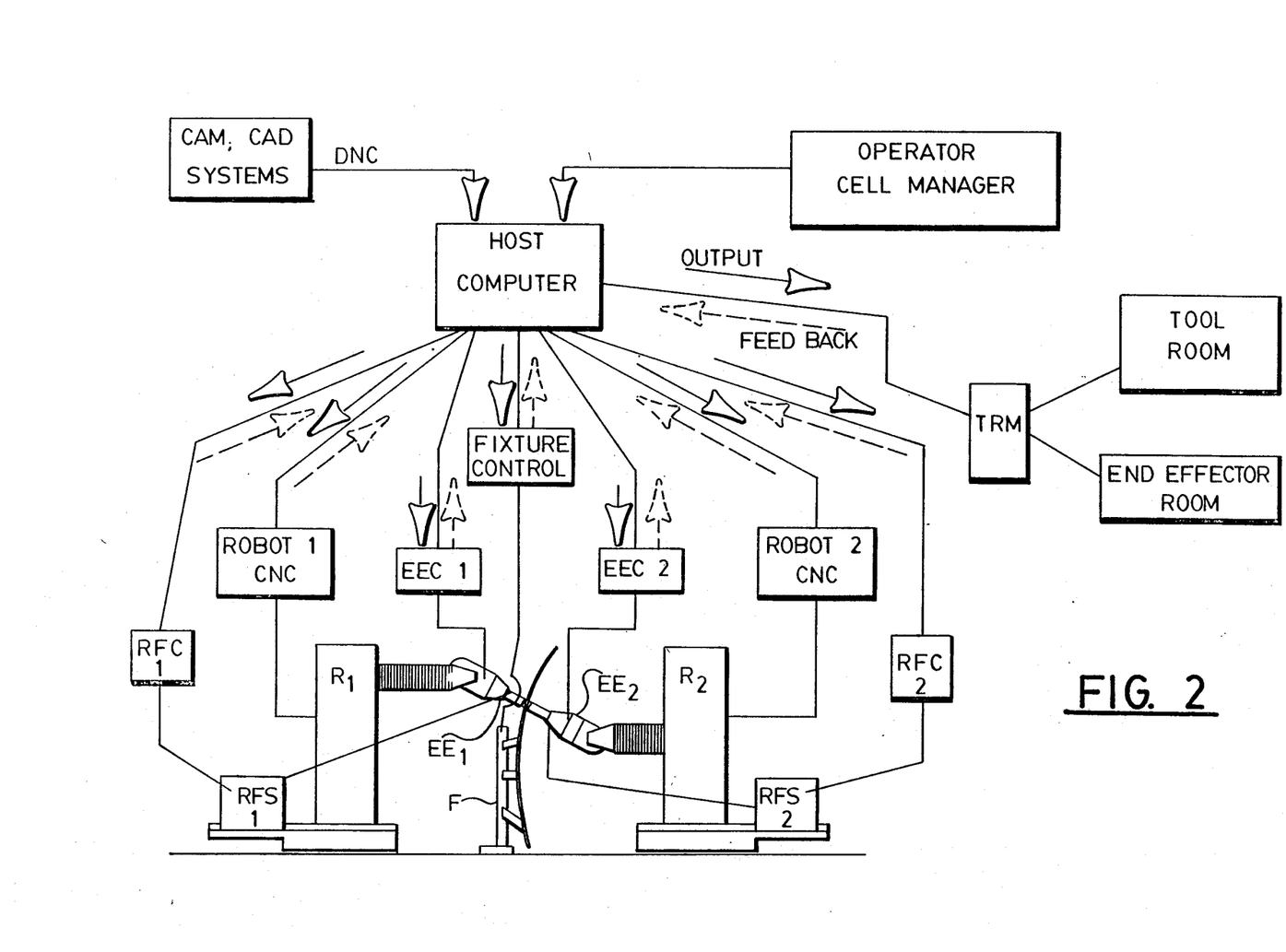
FIG. 2 is a schematic illustration of the work cell of FIG. 1 and related computer controls therefor.

As shown in FIG. 2 the entire work cell is importantly controlled by a host computer which receives computer aided manufacturing (CAM) instructions, via direct numeric control (DNC) or other means as well as operator controlled instructions which determine and/or modify the design of the end assembly. All output signals are sent from the host computer to pertinent lower level computers. As the instructions are performed, feedback signals are returned by the sub-level computers to the host computer.

As indicated the host computer instructs the tool room management computer (TRM) which controls the selection of tools and end effectors to enable the robots to find the correct tools and end effectors in correct pick-up positions. This computer also updates the data files for each end effector and tool. When mobile magazines are used, then the TRM computer controls their management as well.

Rivet feed computers, RFC1 and RFC2, control the rivet feed stations RFS1 and 2 respectively, selecting and controlling the exact type of rivet or fastener to be sent to the end effectors 1 and 2 during the fastening operation.

The continuous numeric controls (CNC 1 and 2) for robots 1 and 2 feed appropriate signals to their respective robots to move the same on all axes whereby to position the tools and end effectors correctly inside of the work envelope.

The end effector control computers (EEC 1 and 2) on receipt of a "start cycle" command, manage the appropriate sequence of movements of robot operation including preparation, clamping, inserting and upsetting of the fasteners.

The fixture control computer, positions all clamps of the fixture F according to the geometry of the parts to be assembled and also controls the fixture configuration to be used in the assembly.

Robotic machine tool centers capable of carrying out the tasks required by this invention are commercially available and are typified by the high speed machining centers marketed by JOBS, PIACENZA, Italy under the name JoMACH.

Such a machine is very versitile and highly accurate in positioning the working tools due to its rigid construction and the utilization of direct reading feedback signals to control all of its movements. Different types of spindles are available for machining different materials, such as low R.P.M. and high torque D.C. spindles for hard metals and high R.P.M. A.C. spindles for composite materials, etc. The capablity of automatically changing tools and end effectors makes a robotic machine of this order convenient for automated and unmanned installations in particular. For example, such a machine is capable of drilling, counter sinking, milling, routing, net trimming, impacting and other machining and measuring operations. In addition, due to the rigidity of the construction and stiffness of its movement axes, the robot is capable of handling a wide variety of end effectors including water jet cutters, ultrasonic knives, riveting and fastening heads.

In conjunction with the aforenoted features the robot is equipped with a probe which, for example, "finds" the exact location of the work pieces. If this is different from the theoretical position, the program of a host computer is automatically translated to adjust to the new position, thereby avoiding the necessity of locating the work piece in a precise theoretical position.

A part adjustment program is also available which makes it possible to adjust the part program according to the geometrical characteristics of the part where these differ from theoretical characteristics. For example, if the drilling operation has to be done in the middle of two assigned points, the machine automatically probes the position of the two points, calculates what the position of the required hole should be and thereafter performs the drilling operation at the new substitute position.

Due to thermal variations in working environment there may be dimensional variations in the work piece and structure of the machine. Special software for the robot control makes it possible to compensate for these variations by modifying the part program depending on the temperature variation. When it is necessary to verify the dimensions of a work piece the robot, via its probe equipment, can act as a coordinate checking instrument. A wide variety of probes are available such as a Renishaw touch probe, as well as nontouch probes using vision or laser technology.

Numeric control of the robots provides a "look ahead" feature or capability that makes is possible to adjust the feed rate of the machine spindle and tools making the same adaptable to complex assembly configurations.

Before entering into a discussion of the method of this invention, a brief discussion of the end effectors or tool heads used with the robots will be set forth.

In the typical application of a robot of the order hereinabove described to the production of aircraft wing sections, for example, many different end effectors and tool packages are required. The detailed aspects of each will not be entertained herein, however, the basic rudimentary features of a drilling unit, a deburring and bucking bar unit, and a riveting unit will be described.

Throughout the description which follows, it will be understood that such units are related directly to the riveting process per se as opposed to ancillary operations which occur in aircraft assembly, such as cold working of the fastener openings or holes, dispensing of sealant between support sections and/or skin panels, and specific tooling variations to accomodate various fasteners, such as blind fasteners, lock bolts, ice box rivets, slug rivets, HI-lock fasteners and others, dictated by the design of the structure.

DRILLING END EFFECTOR

Figure 3:
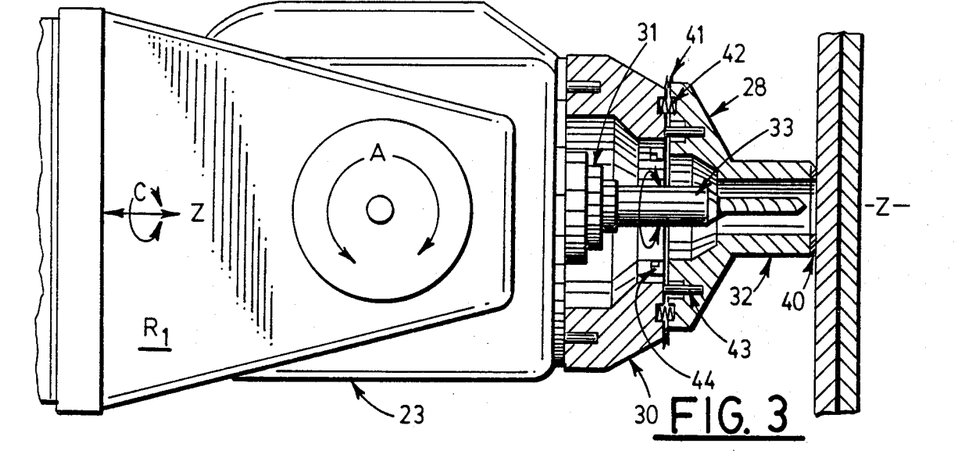
FIG. 3 is a partial elevation, with portions in cross section of a drilling end effector and associated robot conditioned to preform a hold drilling operation.
Figures 3A, 4, 5, 6, 7, 8:
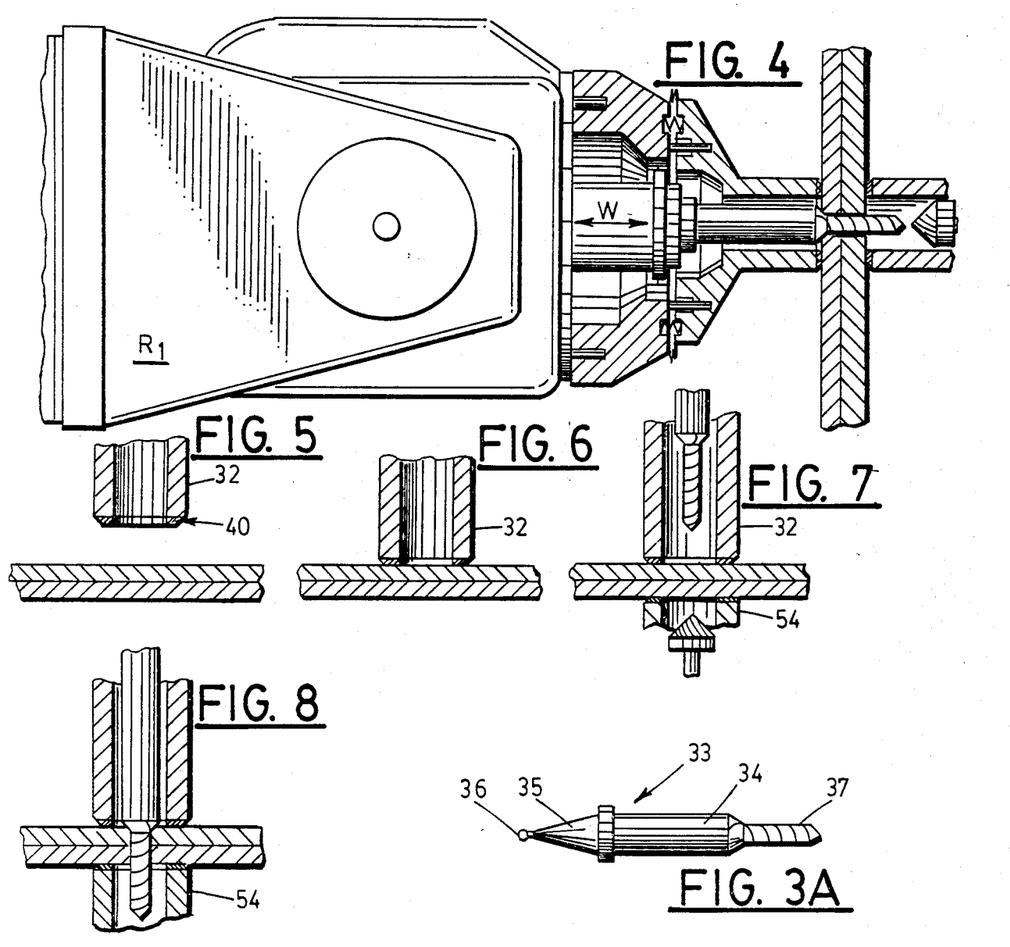
FIG. 3A is a schematic representation of the drilling tool and holder used in the end effector of FIG. 3.
FIG. 4 is a partial elevation, similar to FIG. 3, illustrating the completion of the hole drilling operation.
FIG. 5-8 are schematic views showing the operational sequence of a hole drilling cycle.

Turning to FIGS. 3 and 3A of the drawings, the general features of a drilling end effector 28 are thereat illustrated. As shown, the end effector body is mounted at the outer end of the robot's twist head 23 and utilizes a face plate 30 for connection with the twist head by means of an automatic coupling arrangement known in the art. The drilling end effector preferably utilizes the robot's spindle 31 and the robot's quill axis (W axis) capability for axial advancement and retraction of the drill, which is automatically controlled in accordance with a predetermined computer program to regulate the speed of rotation of the robot's spindle and the feed rates.

The outer end of the effector 28 remotely of the interface plate 30 is distinguished by a cylindrical pressure foot bush portion 32 which is utilizied to engage and "clamp-up" with the work pieces during the drilling operation, as will appear in greater detail hereinafter.

The spindle 31 of the robot is equipped with a drilling tool assembly 33, illustrated in particular in FIG. 3A, comprising a tool holder 34 having a tapered connector 35 insertably coaxially into the robot spindle and equipped with a retention knob 36 at its innermost end for positive coupling connection. The tool holder 34 mounts a drill bit 37 for drilling a hole through the work piece, as desired.

The extreme outer end of the pressure foot bush 32 is equipped with a pressure responsive sensor, indicated at 40, for signaling the robot when the foot bush has touched the skin surface of the opposing work piece preliminary to initiation of the drilling operation. It also will be noted that the end effector 28 is coupled to the interface plate 30 over flexible bellows which prevent the entry of dust, chips and the like impurities and that preloaded springs 42 extend between the body of the effector 28 and the interface plate 30 to normally separate such members in the unloaded or free position of the end effector. Appropriate guide rods and sleeves 43 serve to slidably interconnect end effector 28 with the interface plate 30 for relative coaxialy movement thereof. Microswitches 44 are provided on the interface plate to engage the adjacent surface of the effector 28 when the springs 42 are fully compressed in operation to signal the robot that the effector 28 is ready for the drilling operation. (See FIG. 3)

In addition to the features noted above the drilling end effector is equipped with vacuum or pressurized air means for cleaning and removing chips from the drilled holes, spray means for applying lubricant to the drill bit, and gauge means for measuring the diameter of the drilled hole (none of which features are shown herein).

During the normal operating cycle, the robot R1 finds the location in which a hole is to be made through the work piece or components and positions its head 23 for advancement coaxially of the hole location. The robot advances toward the work pieces until the pressure sensor 40 at the tip end of the pressure foot bush just touches the outer skin or surface of the work piece, at which point advancement of the robot along its Z axis is halted. In this condition the pressure foot bush 32 is against the outer skin of the work piece and the springs 42 between the end effector and the face plate are still in an extended or uncompressed condition. Robot R1 then advances slowly compressing the springs 42 until the microswitches 44 are energized, signaling the robot to stop its advancing movement and hold that position. Robot 1 thereafter holds in this position awaiting the positioning and cooperation of robot R2 as will appear presently. It is to be noted that in the condition illustrated in FIG. 3, the outer end of the pressure foot bush 32 of the end effector 28 is pressed lightly against the work piece and applies slight pressure thereto as effected by the compression of the spring members 42.

CLAMP-UP AND DEBURRING END EFFECTOR

Figure 9:
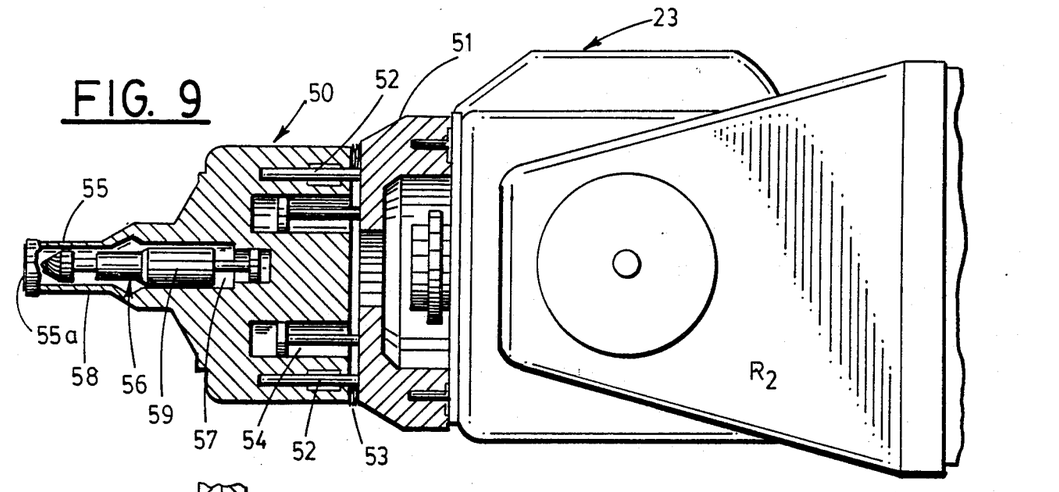
FIG. 9 is a partial elevation, with parts in section, of a clamp-up and deburring end effector and associated robot.

Turning now to FIG. 9 of the drawings, the features of the end effector which cooperates with the drilling end effector 28, above described, during the hole formation and preparation operations is indicated generally by numeral 50. In this particular instance, unit 50 performs the "clamp-up" function for clamping the work pieces firmly together during the hole drilling and preparation operations as well as a deburring function.

As with the drilling end effector 28, the clamp-up and deburring end effector 50 is secured to the twist head 23 of robot R2 via an interface plate 51 attached to the twist head 23. Base pins and guides sleeves 52,52 extend between the face plate 51 and the body of the effector 50 to connect and guide the effector coaxially of the interface plate and independently of axial movement of the robot R2. Dust bellows 53 extend between the body of the end effector 50 and the interface plate to prevent the entry of foreign materials therebetween. Hydraulic or pneumatic pistons and cylinder means 54,54 are provided internally of the effector body; the same having connection with suitable air or hydraulic power connections furnished by the robotic head 23. The outer or tip end of the effector 50 is equipped with a cylindrical pressure foot bush 55 for applying pressure to the work pieces in an area surrounding the hole to be formed therethrough in response to actuation of the piston and cylinders 54,54. The very outermost tip end of the pressure foot bush is fitted with a pressure sensor 55a for signaling the robot when the skin or surface of the work piece confronted by the end effector 50 is engaged.

Mounted coaxially of the pressure foot bush 55 and within body of effector 50 is a deburring unit comprising a pneumatic actuator 56 mounted for axial movement in response to actuation of additional pneumatic or hydraulic piston and cylinder means 57 located at the rearward end of actuator 56. Actuator 56 is operable to rotatably drive a deburring tool 58 mounted in a quill chuck thereof. To facilitate the axial reciprocating movement of the deburring motor 56, a guide sleeve 59 is provided concentrically thereabout to support the same and provide sealed connection with the piston and cylinder actuator means 57.

In cooperation with the drilling end effector 28 above described, robot R2 is operatively disposed in coaxial relationship with the Z axis of robot R1 but on the opposite side of the work pieces' Foot bush 55 thereof is then brought into pressure bearing relationship with the work pieces to apply a pre-selected and pre-programmed clamping pressure thereto before initiation of the drilling and deburring cycle by programmed actuation of the spindle 31 of R1 and piston and cylinder means 54 of R2.

HOLE PREPARATION

In order to understand the utilization and operation of the two described end effectors 28 and 50 of FIGS. 3 and 9, respectively, reference will now be had to FIGS. 3–12 of the drawings which illustrate the sequence of operations involved in the functions of clamp-up, drilling and deburring for a typical hole preparation cycle.

In response to commands from the host computer the following sequence of events occur.

The TRM computer signals the tool room to present the proper tools for pick-up by the two robots R1 and R2. In response to the CNC 1 and 2 computers, the two robots reach their respective tool magazines and pick up the correct tooling.

The TRM computer signals the end effector rooms to present the proper end effectors to the two robots followed by operation of the robots to reach and pick up their respective end effectors.

The robots next position the end effectors in coaxial alignment on opposite sides of the work pieces at a specified hole location. In this condition the outer ends of the end effectors are spaced from the skins or surfaces of the opposing work pieces as indicated in FIG. 5 for end effector 28 and in FIG. 10 for end effector 50.

CLAMP-UP

Thereafter in response to signals from EEC1, robot R1 moves its end effector 28 until it stops against the skin of the adjacent work piece, in the manner illustrated in FIGS. 5 and 6 of the drawings. In this condition the pressure sensitive switch 40 at the outer end of the foot bush 32 signals robot R1 that it has reached the surface of the work piece whereupon the R1 advances slowly along its Z axis sufficiently to compress springs 42, as previously noted, until microswitches 44 are activated to halt further advancing movement of robot R1. Robot R1 and its end effector are thereupon locked into position as shown in FIG. 3.

Figure 10:
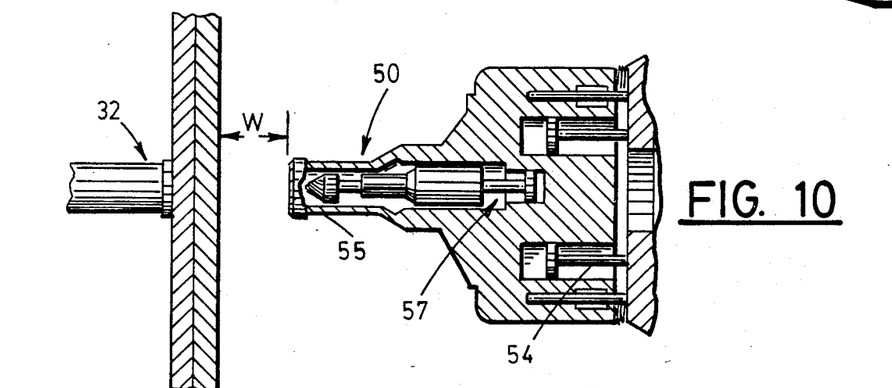
FIGS. 10, 11 and 12 are partial elevations schematically showing the clamp-up and deburring operation of the end effector shown in FIG. 9.

Meanwhile, robot R2 has moved its end effector 50 to the position illustrated in FIG. 10 where it remains fixed against movement along its Z axis, but with the outer end of the foot bush 55 thereof disposed at a distance W from the adjacent face of the opposing work piece. Distance W is less than the stroke of the pneumatic piston and cylinder actuators 54 associated with end effector 50. At this stage the actuators 54 advance the body of end effector 50 forwardly the distance W until the same engages the skin of the adjacent work piece coaxially opposite the foot bush 32 of the drilling end effector 28. (See FIG. 11). Further programmed movement of effector 50 applies a predetermined clamping pressure (in the order of 50–180 psi) to the work piece about the hole site to counteract the force and spring pressure applied by the foot bush 32 of the stationary drilling end effector.

It is to be noted that the forces applied at "clamp-up" in the drilling cycle are of a magnitude to tightly clamp the work pieces together preventing the entry of any burrs or shaving therebetween, but at the same time limiting the forces against the work pieces to avoid deformation or overstressing of the material thereof and as well as avoiding the imposition of possible deforming thrust forces on the work pieces which could be transmitted to the fixture and to the overall assembly. Thus, in effect, the work pieces, fixture and assembly remain in a neutral predetermined fixed position during the drilling operation, free of over stressing and deformation forces.

HOLE DRILLING

At this stage, initiation of the drilling activity takes place by appropriate signal of CNC 1 to robot R1, activating its spindle 31 along the W axis in accordance with the pre-programmed RPM and feed rate. (See FIG. 7). This condition is illustrated in FIGS. 4 and 8 of the drawings. If desired the drill bit is formed so that the hole through the work pieces is suitably counterbored on one side as shown.

DEBURRING

Figure 11:
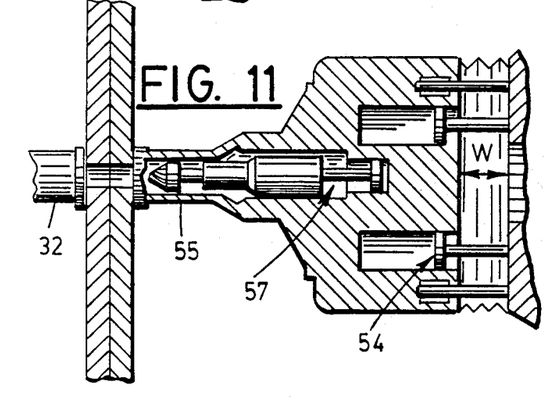
Figure 12:
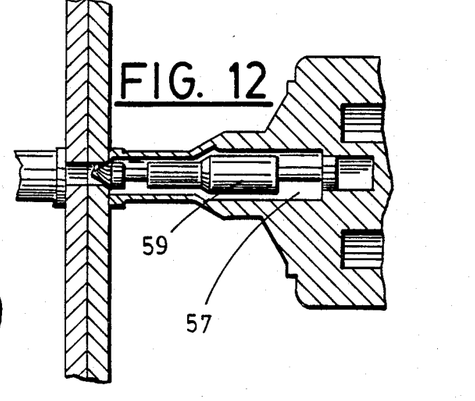

Deburring of the opposite end of the hole is effected by robot R2, as indicated in FIGS. 11 and 12 of the drawings, by advancing the deburring motor 56 and its deburring tool 59 a pre-programmed distance sufficient to remove any burrs and shavings from the adjacent edge of the hole engaged thereby, to complete the formation and preparation of the hole through the two work pieces.

It is to be noted that in respect to the deburring operation, the same may be carried out by the spindle of robot R2, similar to the drilling operation, by using a tool holder, such as 34 illustrated in FIG. 8, with a deburring tool and a second drilling end effector 28 in place of the clamp-up and deburring end effector 50 illustrated in FIGS. 9–12.

Finally the two end effectors 28 and 50 are withdrawn from opposite sides of the work pieces, and the robots are moved to the next hole location and/or to the tool selection and tool pick up positions if tool change is required. In this latter respect, if the drill bit is dull or worn, the computer program will automatically order a tool change. If the hole is to be reamed or cold worked, tool change will be required.

RIVETING END EFFECTOR

Figure 13:
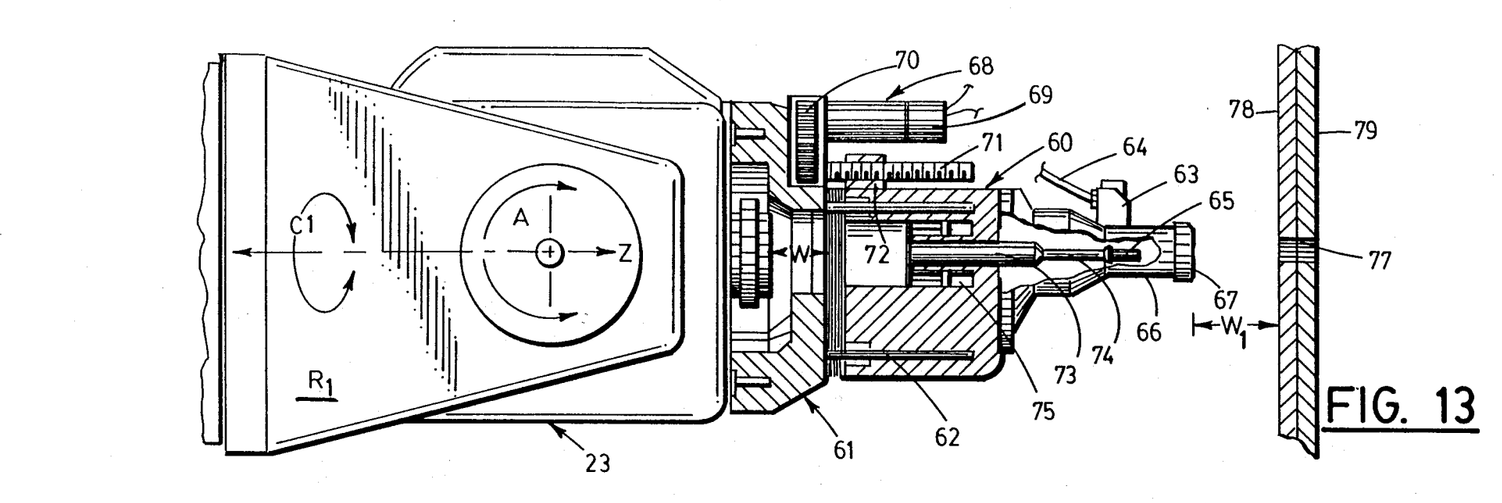
FIG. 13 is a partial elevation, with portions in section and broken away, of a riveting end effector and robot conditioned for clamp-up operation.

Turning now to FIG. 13 and of the drawings, the general features and organization of an end effector 60 for inserting and upsetting fasteners is illustrated.

Unit 60 is attachable to the wrist head 23 of robot R1 and employs an interface plate 61 which is automatically coupled to the end of the robot head by an automatic loading system of known characteristics. Guide sleeves 62 extend from the interface plate to guide the body of unit 60 during axial clamp-up movement of unit 60 relative to plate 61. A rivet feed shuttle 63 having a supply tube 64 communicating with a supply of rivets serves to feed rivets 65 or similar fasteners to the interior of a pressure foot bush 66 which is equipped with a pressure sensor means 67 at its outer tip end.

An electric drive motor 68 is positioned on one side of the unit 60 and is equipped with a dynamic brake system 69 for quickly stopping the motor 68. The motor 68 drives a gear train 70 which rotatably drives a screw means 71 having an associated follower nut 72 affixed to the body of unit 60 so that upon energization of motor 68 the follower nut 72 is advanced along the screw 71 to axially move the end effector unit 60 along guides 62.

Internally unit 60 carries actuator 73 capable of driving an impact tool 74. Tool 74 normally engages the heads of rivets fed in advance thereof (see FIG. 13) in response to axial movement of activator 73 produced by actuation of the hydraulic or pneumatic piston and cylinder system 75 associated therewith.

Figure 14:
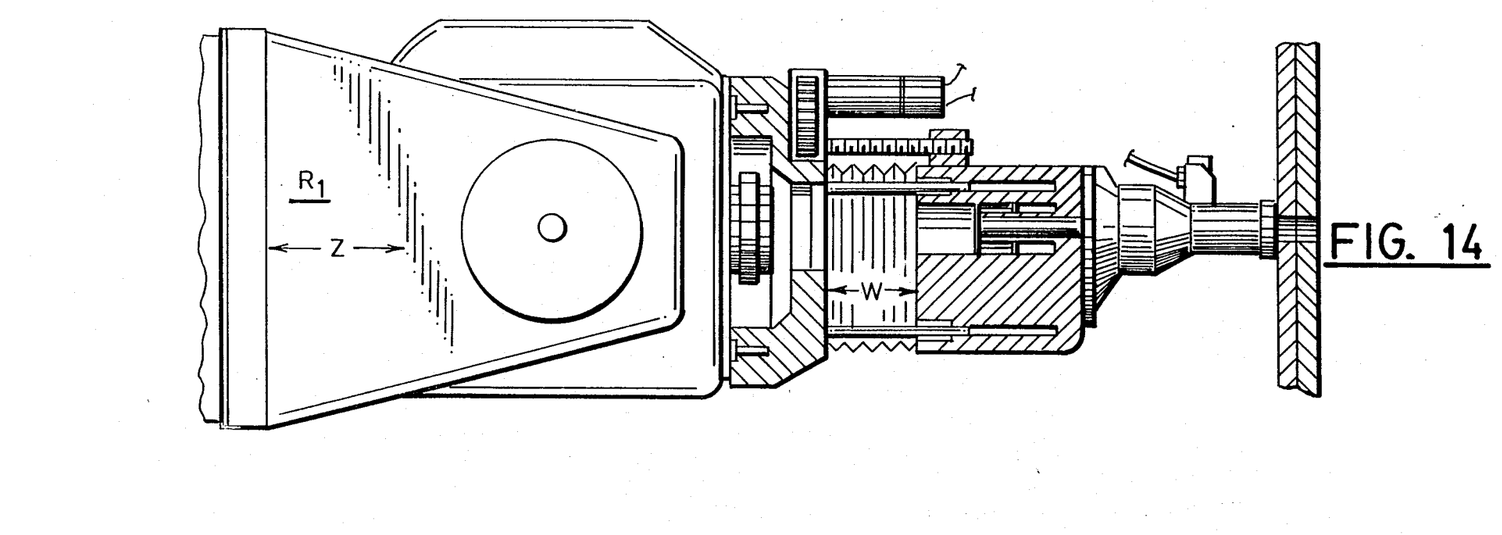
FIG. 14 is a partial elevation, similar to FIG. 13, showing the end effector thereof in clamp-up position.

In normal operation the robot R1 advances the riveting end effector 60 to a position substantially as indicated in FIG. 13 whereat the pressure foot bush 66 thereof lies in coaxial alignment with a hole 77 previously drilled through the two work pieces 78 and 79. In this condition the tip end of the pressure foot bush 66 is spaced a distance W1 from the skin or face of the opposing work piece 78. Energization of the motor 68 serves to advance the body of end effector 60 toward the work pieces until the pressure sensor 67 at the outer end of the foot bush contacts the skin of the work piece 78. Sensor 67 signals the motor 68 to stop accompanied by energization by the dynamic brake 69. This condition is shown in FIG. 14 of the drawings.

BUCKING END EFFECTOR

Figure 15:
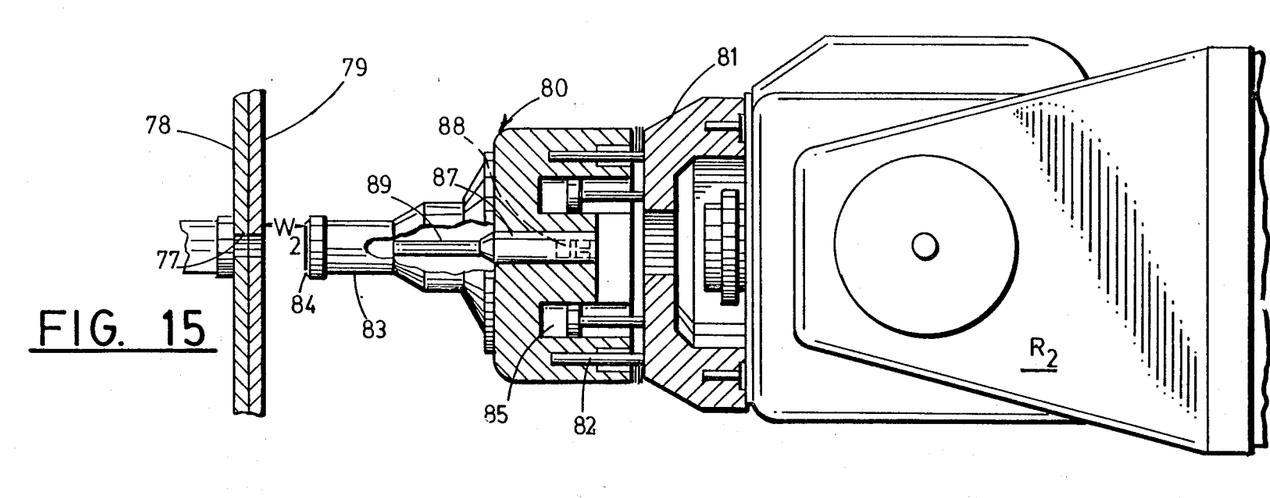
FIG. 15 is a partial elevation with portions in section of a bucking bar end effector and associated robot in pre clamp-up position.
Figure 16:
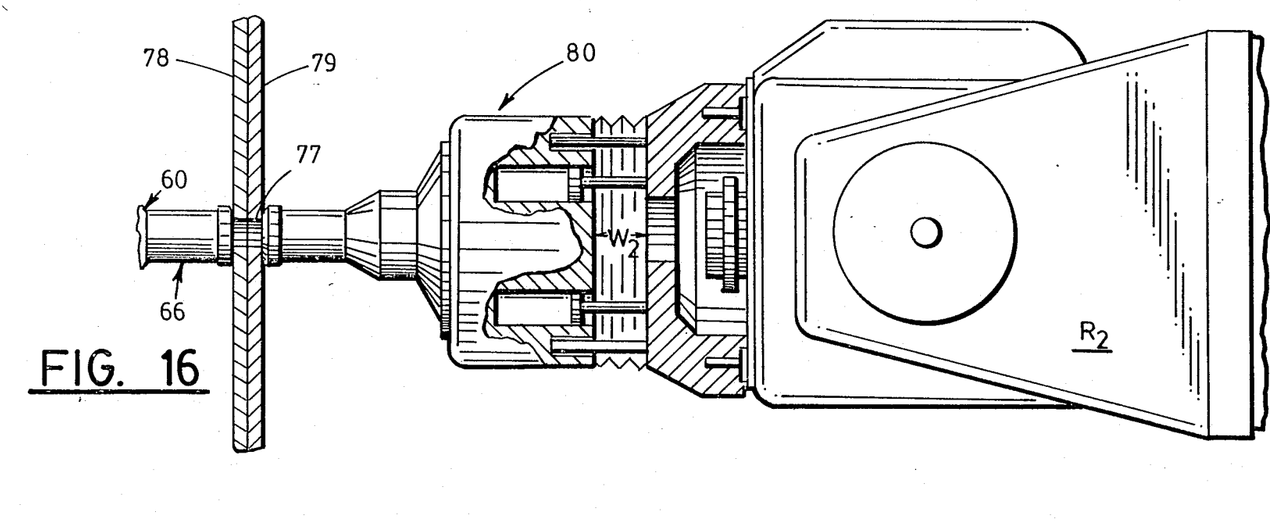
FIG. 16 is a partial elevation showing the end effector of FIG. 15 in a clamp-up position.
Figure 17:
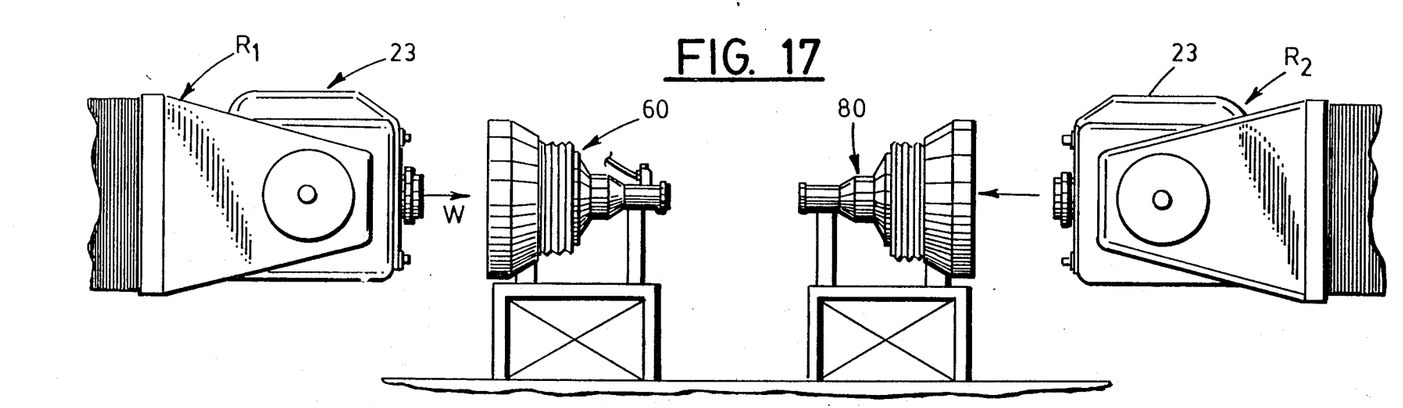
FIGS. 17-24 are partial elevations illustrating a complete riveting cycle of operation for the roboticly operated end effectors of FIGS. 13 and 15.

Turning to FIGS. 15 and 16 of the drawings, the features of a bucking unit for use in the rivet installation procedures is illustrated as comprising end effector 80 coupled to an interface plate 81 having connection with robot R2 in a manner as noted heretofore. The end effector unit 80 comprises plural guide pins and sleeves 82 for guiding the body of unit 80 a distance W2 relative to the interface plate 81 during the normal clamp-up operation, as will appear hereinafter. The outer or tip end of the end effector 80 is constructed to provide a cylindrical foot bush 83 for applying clamping pressure to the work pieces 78 and 79 in opposition to the pre-positioned stationary riveting end effector unit 60. The tip end of the foot bush 83 is equipped with pressure sensitive switch or sensor means 84 which functions upon contact with the skin or surface of the work piece 79 to signal the computer control of robot R2 that surface engagement has been achieved by the end effector pressure foot bush 83.

Advancing movement of the end effector 80 distance W2 to bring the pressure foot bush 83 into contact with the work piece 79 is effected by computerized control activation of the hydraulic or pneumatic piston and cylinder means 85, similar to the corresponding operation of the deburring end effector unit 50 of FIGS. 9–12. When the pressure sensitive switch or sensor 84 is activated upon engagement with the surface of work piece 79, pre-determined high pressure is applied to the actuating piston and cylinders 85 to press the foot bush 83 against the work piece 79 in opposition to the end effector unit 60 as shown in FIG. 16 of the drawings. This application of increased pressure serves to tightly clamp the work pieces together and is of course regulated and pre-determined in accordance with the computer program designated for the work parts involved. In the opposed axially aligned condition of the two robots and their respective end effectors, as illustrated in FIG. 16, the rivet installation and upsetting operations may be carried out.

In order to achieve rivet upset, the bucking end effector unit 80 of FIG. 15 is equipped with an internally disposed activator 87 adapted to be moved coaxially of the pressure foot bush 83 by means of additional piston and cylinder actuators 88. Unit 87 carries a bucking bar 89 capable of being moved into coaxial alignment and engagement with the outer end of a rivet disposed in the previously drilled hole 77 by the riveting end effector 60 as will be described in greater detail presently.

It will be appreciated that the illustrations set forth in FIGS. 15 and 16 basically depicts the "clamp-up" movement of the bucking end effector 80 in conjunction with the previously described riveting end effector 60 which is stationarily positioned on the opposite side of the work components 78 and 79, as illustrated in FIG. 14 of the drawings.

Before leaving the description of the end effector 80 it is to be noted that in the event the fastening device supplied by the riveting end effector unit 60 (more specifically by the rivet feed unit 63 thereof) requires a nut or collar fastening connection, as in the case of a HI-lock nut unit, the bucking end effector unit 80 is also equipped with a conventional rivet feed unit 63 to supply the necessary fastening nut. Appropriate modification of the actuator 88 and tooling is also required in order to effectuate the alternate fastening function.

RIVET INSERTION AND UPSETTING

Having accomplished the clamp-up function as illustrated in FIG. 16, for example, the parts and robots are in condition for the insertion of fasteners such as a solid metal rivet for completion of the upsetting and fastening operations. This cycle and functional operation is illustrated in FIGS. 17–28 of the drawings as will now be described.

In response to appropriate signals from the host and sub-level computers as previously discussed, both robots R1 and R2 pick up their selected tools and end effectors 60 and 80 from their respective tool magazine. During the pick up and attachment of the end effectors to the working heads 23 of the robots, all the utility connections for power, pneumatic, hydraulic supplies and so forth are activated for the tooling carried by the end effectors. This operational condition is illustrated schematically in FIG. 17 of the drawings.

Figure 18:
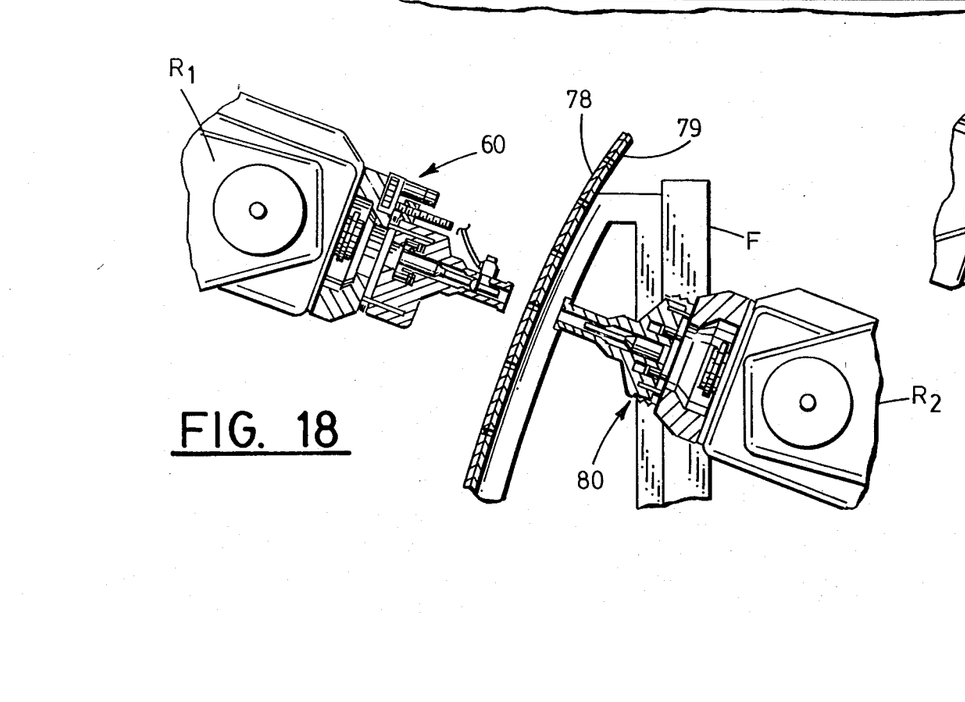
Figure 19:
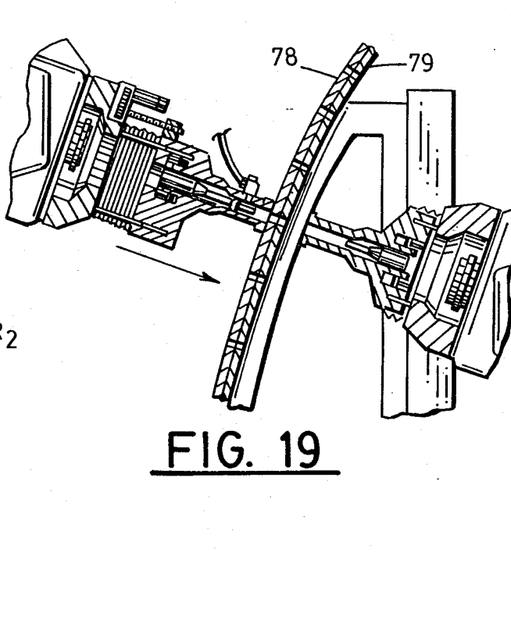
Figure 20:
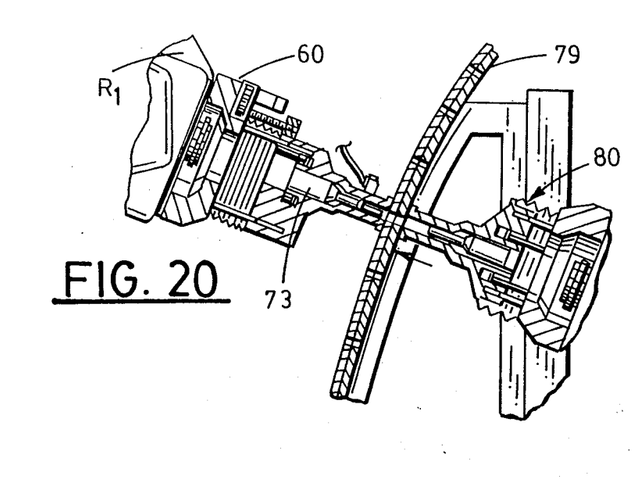

Following the pick-up and connection of the end effectors to their respective robots, the latter are positioned in axial alignment with a selected pre-determined hole location as shown in FIG. 18. During this stage of the cycle the only task of the robots is to orient the end effectors coaxially of a hole positions previously drilled during the hole preparation cycle. Once located opposite a hole, the robots rigidly maintain the tooling in aligned positions until the automatic riveting cycle is completed. When in the hole alignment position indicated in FIG. 18, the end effector 60 is advanced until it lightly touches the skin or outer surface of the opposing work piece 78, as indicated in FIG. 19. Next robot R2 causes its end effector 80 to advance until it reaches and touches the face of the opposing work piece 79, after which it pushes against the assembly parts counteracting any forces exerted on the parts by the end effector 60 and applying sufficient force to tightly clamp the parts together in accordance with the pre-determined force component as dictated by the computerized control of robot R2. This "clamp-up" stage is illustrated in FIG. 20 of the drawings.

Figures 21, 22, 24:
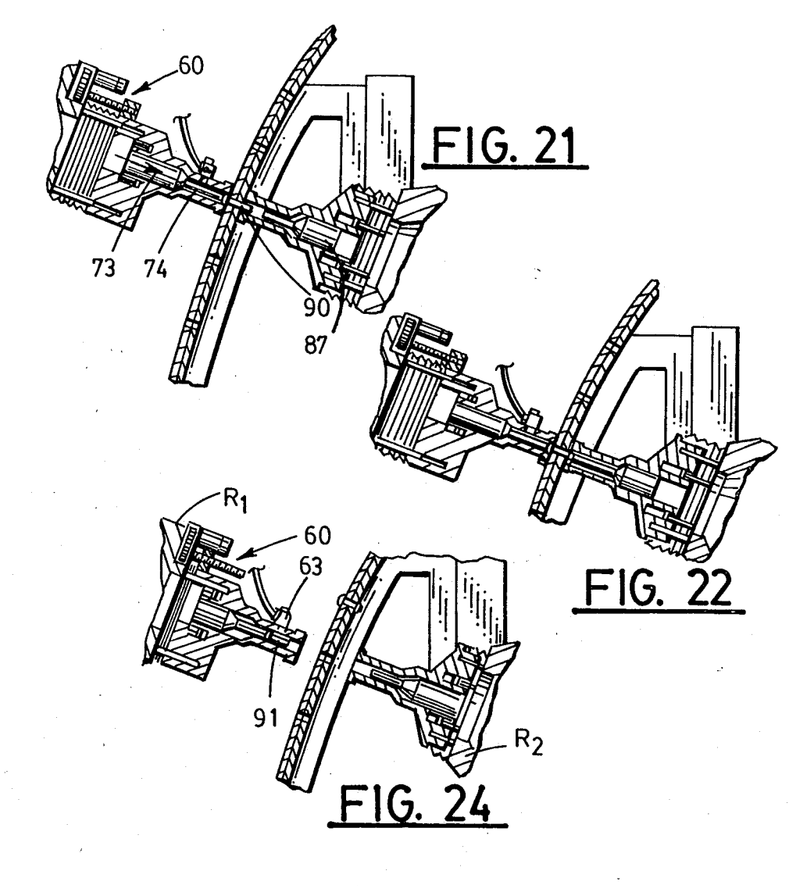

As soon as "clamp-up" condition is achieved, a rivet 90, having been previously fed to the barrel of the foot bush portion of the end effector 60 is fed forwardly by operation of actuator 73 and inserted through the selected opening by the impact tool 74 which is held against the head of the rivet as shown in FIG. 21. In this latter regard the pressure exerted against the rivet 90 by the tool 74 induces only sufficient thrust on the rivet to hold it in position.

Figure 23:
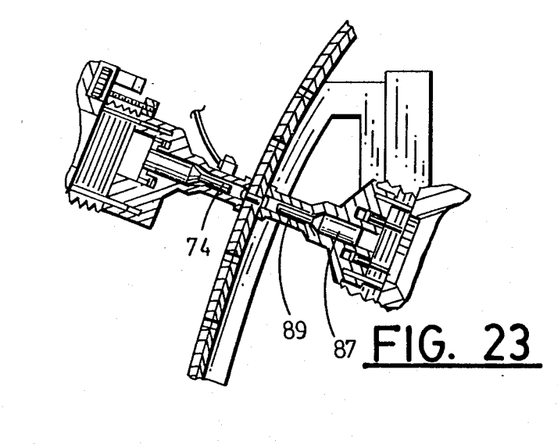

Next the bucking bar end effector 80 is activated to advance the actuator 87 and associated bucking bar tool 89 against the opposite end of rivet 90. The rivet is now ready to be installed. Rivet installation is accomplished by simultaneous activation of the actuators 73 and to accordingly upset the rivet as indicated in FIGS. 22 and 23 of the drawings.

After rivet installation has been completed the riveting tool and bucking bar units are withdrawn from the work pieces and the respective work heads or end effectors retracted to their original positions for movement to the next hole. During this transitional movement of the robots R1 and R2 to the next hole location, a new rivet 91 is inserted into the nose end of the end effector 60 by the rivet feed means 63. This operational condition is illustrated in FIG. 24 of the drawings. A repeat of the above described riveting cycle is initiated, setting the next rivet and so on, hole by hole, until all the riveting is complete.

Importantly it is to be noted that the particular rivet or fastener fed to the riveting end effector is determined by the selection process of the rivet magazine RFS1 under auspices and control of its sub-level computer RFC1. In the event that the fastening device of the type requiring a collar or a nut, for example, RFS2 operates with a bucking bar unit equipped with a rivet feed means 63 as heretofore mentioned, to supply the necessary fasting part to the bucking bar end effector for installation of the appropriate multiple piece fastening unit. In those instances where a change in the type of fastener is involved, change in the end effectors is necessary. In that event end effectors carrying the necessary tooling are automatically positioned for pick-up by the robots after deposit of the previously coupled tooling.

Figure 25:
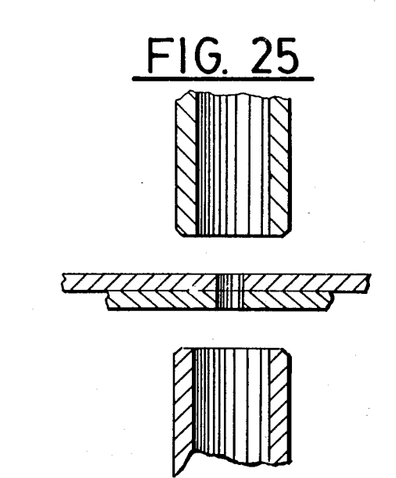
FIGS. 25-30 are partial elevations schematically showing the successive step of installing a rivet.
Figures 26, 27:
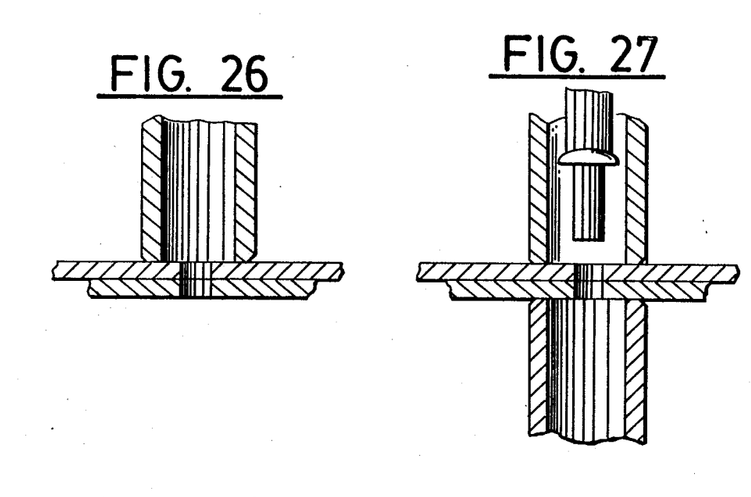
Figure 28:
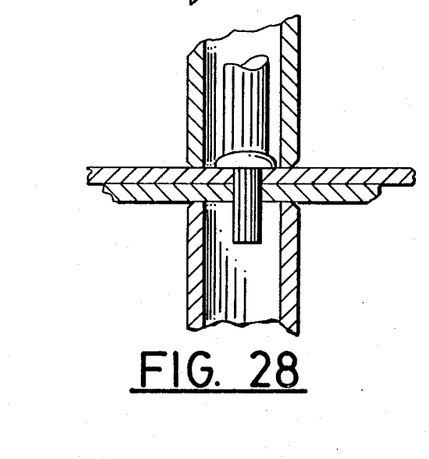
Figures 29, 30:
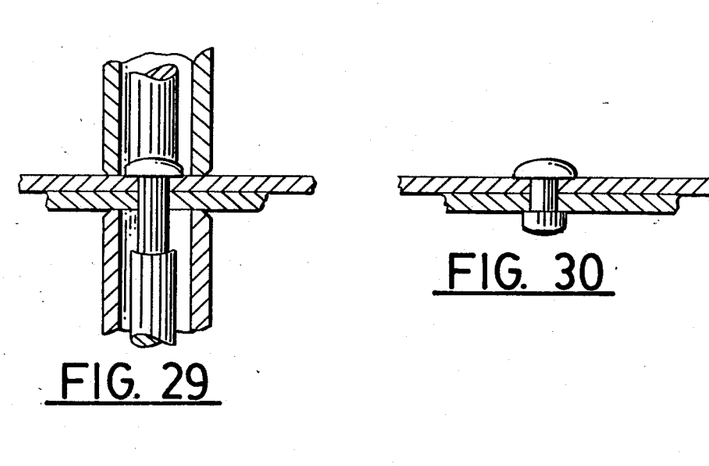

Be that as it may, the principal steps of installing a rivet in accordance with the process of this invention are schematically set forth in FIGS. 25-30 in which: FIG. 25 demonstrates hole selection and hole alignment of the robots; FIG. 26 demonstrates the initial engagement of one side of the assembled parts by the riveting end effector; FIG. 27 shows the coaxial engagement on opposite sides of the work pieces by both end effectors including the clamp-up or application of counteracting forces and the infeed of a rivet to be inserted; FIG. 28 demonstrates the insertion of the rivet; FIG. 29 shows the positioning of the bucking bar tooling by the opposing end effector associated with the robot R2 for upsetting the rivet to achieve riveted connection as illustrated in FIG. 30.

TACKING

With respect to the hole preparation and riveting cycles hereinabove described, particularly as such relate to the assembly of relatively large structures as occur in the aircraft industry, it is often necessary to temporarily hold the parts together preparatory to assembly in order to avoid any relative movement of parts during hole preparation and fastening. Any shear movement of either of the parts, particularly after hole preparation would prevent the robots from relocating the hole positions and fitting the rivet into the hole. Thus a temporary fastening cycle is usually involved before beginning the hole preparation cycle. Subsequently, after the final fastening cycle is completed, the temporary tacking fasteners are removed and replaced by final fasteners.

It is to be noted that tacking is carried out by the utilization of temporary or throw away fasteners which are located in the exact same position as final fasteners. The diameter of the temporary fastener is always smaller than the diameter of the final fastener so that it can be removed without leaving any trace of the tacking procedure. Removal is accomplished by simply performing the hole preparation cycle in the same position for the final fastener after which the final fastener is installed as hereinabove described.

The usual cycle for the temporary fastener program is generally as follows:

The various tacking points where the parts are to be temporarily fastened are selected and throw away fasteners inserted at these points. Generally the temporary tacking fasteners are installed by drilling and installation cycles being performed without clamping release of the parts between the two operations. This may be accomplished conveniently by use of blind fasteners in robot R2 and a drilling end effector 28 in robot R1. (See FIG. 3). Following installation of the tacking fasteners, the final fastener hole preparation cycle is performed for the entire assembly, skipping the holes where the temporary fasteners are located. After hole preparation is completed, as above described, installation of the final fasteners is performed, again skipping the points where the temporary fasteners are located. The robots then proceed to re-locate the various tacking positions and the drilling and hole preparation cycle for the final fastener is carried out at each such location, removing the temporary fastener. Thereafter the robots change their end effectors and return to the hole locations from which the temporary fasteners have been removed to install the final fasteners or rivets as required per FIGS. 18-24.

In view of the foregoing it is believed that those familiar with the art will readily understand and appreciate the novel advancement presented hereby and will readily recognize that while the same has been described largely in association with its utilization in the aircraft industry, its teachings and concepts are equally applicable to other areas and industries where fastening by rivets and like rigid fasteners are involved. In addition, while the invention hereof has been described largely in association with particular tools and working apparatus, it is to be understood that such instrumentalities and are susceptible to variation, modification and substitution of equivalents without departing from the spirit and scope of the invention which is intended to be unlimited by the foregoing except as may appear in the following appended claims.

The embodiments of the invention in which an exclusive property or privilege is claimed are defined as follows:

1. A method of riveting assembly components by means of computer controlled mobile machine tool centers or robots comprising the steps of:
   (a) holding the assembly components to be riveted in predetermined fixed positions of interfacial engagement;
   (b) mounting hole-forming tools and work-engageable end effector means on the tool head of a first robot;
   (c) mounting work-engageable end effector means on the tool head of a second robot;
   (d) positioning said first and second robots on opposite sides of the held components and in coaxial alignment with a pre-determined hole location thereon;
   (e) actuating said end effector means on said first and second robots to engage and tightly clamp said components therebetween;

(f) controlling the clamping forces applied to said components to avoid stress and unbalanced thrust forces thereon;

(g) actuating said hole-forming tools to form a rivet hole through said components at said hole location;

(h) unclamping said end effectors and positioning said robots in coaxial alignment with another hole location; and performing steps (d) through (g) thereat and repeating this step until all the rivet holes are formed through said components;

(i) replacing the end effector means and hole-forming tools on the heads of said robots with end effector means comprising rivet setting tools, work-engageable means and means for feeding rivets to the rivet setting tools;

(j) repositioning said robots on opposite sides of said components and in coaxial alignment with a previously formed rivet hole;

(k) actuating said robots and end effector means to clamp said components tightly therebetween with regulated clamping force to avoid stress and unbalanced thrust forces thereon;

(l) actuating said rivet feed means to position a rivet for insertion into said previously formed rivet hole;

(m) actuating said rivet setting tools to insert and upset said rivet in said previously formed rivet hole; and (n) unclamping said end effector means and successively repositioning said robots in coaxial alignment with each of the previously formed rivet holes and repeating steps (k) through (n) thereat until a rivet is installed in each of the previously formed holes.

2. The method of claim 1, wherein said end effector means mounted on the tool head of said second robot according to step (c) comprises hole deburring tools, and actuating said deburring tools after completion of step (g).

3. A method of interconnecting assembly components with fasteners by utilizing a pair of computer-controlled machine tool centers capable of multi-axis movements and operable in mirror relationship on opposite sides of said components, comprising the steps of:

fixing the components to be assembled in a stationary position;

mounting hole-making tools on one of said tool centers;

mounting end effectors on both of said tool centers which are operable to engage and clamp said components together with pre-determined force at each hole location;

positioning said tool centers coaxially opposite a pre-determined hole location on said components;

actuating said end effectors to clamp said components;

actuating said hole-making tools to form a fastener hole through said components at said location;

releasing said end effectors and successively positioning said tool centers coaxially opposite additional hole locations and repeating the clamping and hole-forming steps thereat to form a series of spaced fastener holes through said components;

replacing the hole forming tools and end effectors on said tool centers with fastener setting tools and end effectors operable to clamp the components therebetween and having means for feeding fasteners for insertion into the formed fastener holes;

repositioning said tool centers coaxially of a formed fastener hole and actuating said end effectors to clamp said components therebetween;

activating the fastener feed means and fastener-setting tools to insert and install a fastener in a fastener hole confronted thereby; and repeating the last two recited steps at each fastener hole.

4. Apparatus for interconnecting components of an assembly by means of selected rivet type fasteners comprising:

plural mobile, high speed, remote-control, automatic machine centers or robots capable of multi-axis movements;

each robot comprising a base supported for movement along a horizontal X-axis, a vertical column supported by said base and rotatable about a vertical Y-axis, a horizontal ram supported on said column for movement along the latter's vertical axis and along its own horizontal Z-axis, a biaxially rotatable head at the outer end of said ram, and a rotatably driven tool driving spindle carried by said head and independently moveable relative to said head along a linear axis;

fixture means for rigidly holding components to be assembled in stationary position between said robots; the heads of said robots being moveable along said X, Y, Z axes and about said rotatable axes for positioning the same at any location on opposite sides of said components;

means for supplying selected fasteners to said robots;

means for automatically changing and equipping said robots with selected tools and supporting end effectors as required to form and prepare holes in said components and install selected fasteners therein; and computer means for controlling and managing coordinated operation of said apparatus in accordance with a pre-determined program and assembly geometry whereby to cause said robots to move over and be positioned at selected locations on opposite sides of said components whereat to effect the interconnection of said components.

5. The apparatus of claim 4, wherein said computer means comprises a host computer controlling a plurality of sub-computers in direct command of said robots, said fixture means, said means supplying fasteners, said means for equipping said robots, and said end effectors.

6. The apparatus of claim 4, wherein said computer means cause said robots to work in mirror relation on opposite sides of said components to form a series of fastener holes therethrough at designated locations followed by subsequent repositioning of said robots opposite each said previously formed hole to install a fastener therein.

7. The apparatus of claim 4, and probe means operatively carried by said robots for verifying the computer programmed position of said fixture and said components.

8. The apparatus of claim 4, wherein each of said end effectors comprises a body attachable to the head of a robot and having foot-bush means equipped with a sensor at the outermost end thereof for determining engagement of the foot bush means with adjacent assembly components; the foot-bush means associated with a pair of said robots cooperating to clamp said components about each hole location with pre-determined clamping force without imposing unbalanced stress and thrust forces on said components and fixture means.

9. The apparatus of claim 8, wherein said end effectors comprise power actuated means for advancing and retracting power actuated tools carried thereby.

10. The apparatus of claim 9, wherein said tools are hole preparation tools.

11. The apparatus of claim 9, wherein said tools are fastener installing tools.

12. The apparatus of claim 4, wherein said end effectors comprise foot-bush means for uniformly engaging the assembly components about each hole location, and means for axially moving said foot-bush means into engagement with said components, independently of axial movement of said ram and tool-driving spindle, to clamp said components together.

13. The apparatus of claim 4, wherein said selected end effectors include a fastener installation end effector comprising means for detachably mounting the same on the head of a robot, a main body including an extending cylindrical foot-bush having an outer end engageable with components addressed thereby, fastener installing tools operable independently of the driving spindle of said robot; and means for feeding fasteners into the interior of said foot-bush for insertion by said tools into a previously formed fastener hole.

14. Apparatus for automatically interconnecting metal components of an assembly by means of selected rivet fasteners comprising:
- a pair of mobile, high speed, remotely-controlled, automatic machining centers or robots having tool heads operable for movement along three linear and about at least two rotational axes whereby said heads are capable of selected spacial positioning;
- fixture means for rigidly holding components to be assembled in stationary position between said robots whereby the heads of the latter are moveable to any selected location on opposite sides of said components;
- clamping means carried by said tool heads for clamping said components together with pre-determined force selected to control and neutralize stress forces on said fixture means and components; said clamping means being selectively activated at pre-determined locations on said components where holes are to be formed and fasteners installed therein;
- tool means selectively attachable and driven by said tool heads for forming and preparing fastener holes through said components at said location;
- means for supplying at least one of said robots with selected fasteners;
- additional tool means selectively attachable to and driven by said tool heads for receiving and installing said fasteners in said holes, and
- computer means for controlling and managing coordinated operation of said robots in accordance with a pre-determined program and assembly geometry whereby to cause the heads thereof to move over opposite sides of said components and carry out hole preparation and installation of said fasteners.

15. The assembly of claim 14, wherein said computer means controls said robots to work in mirror relationship on opposite sides of said components to form a series of holes at said pre-determined locations followed by subsequent repositioning of said tool heads opposite each of said formed holes for installation of said fasteners thereat.

16. The assembly of claim 14, wherein said clamping means are provided by opposingly aligned end effectors mounted on the tool heads of said pair of robots; each end effector comprising foot-bush means for engaging one face or side of an adjacent component to be assembled, and sensing means carried by each said foot-bush means for sensing engagement of each foot-bush means with said components whereby to determine the application of clamping forces thereon.

17. The assembly of claim 14, wherein said computer means, comprises a host computer controlling a plurality of sub-computers in direct command of said robots, said fixture means, said means for supplying fasteners, said clamping means, said tool heads and said tool means.

* * * * *